UNITED STATES PATENT OFFICE.

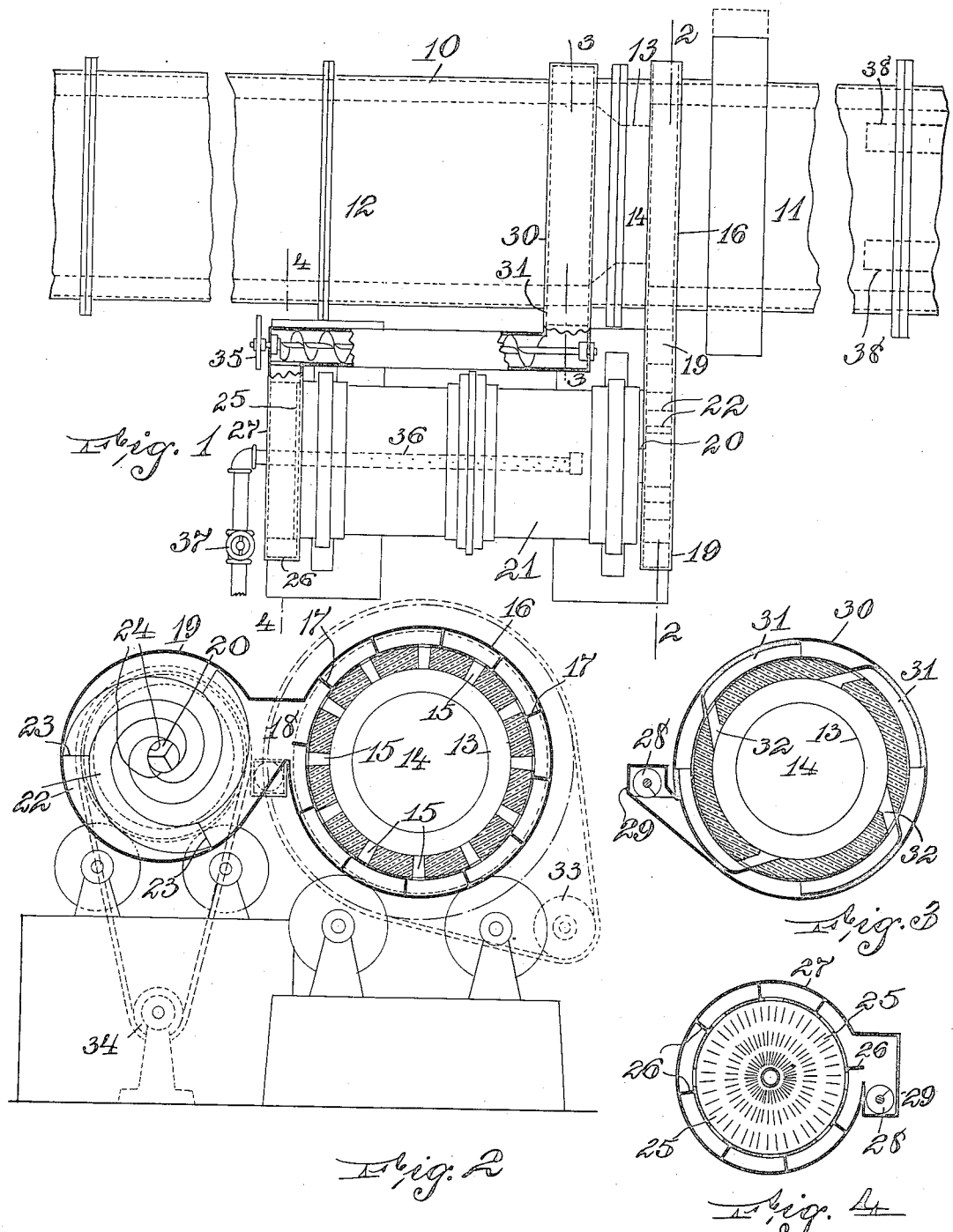

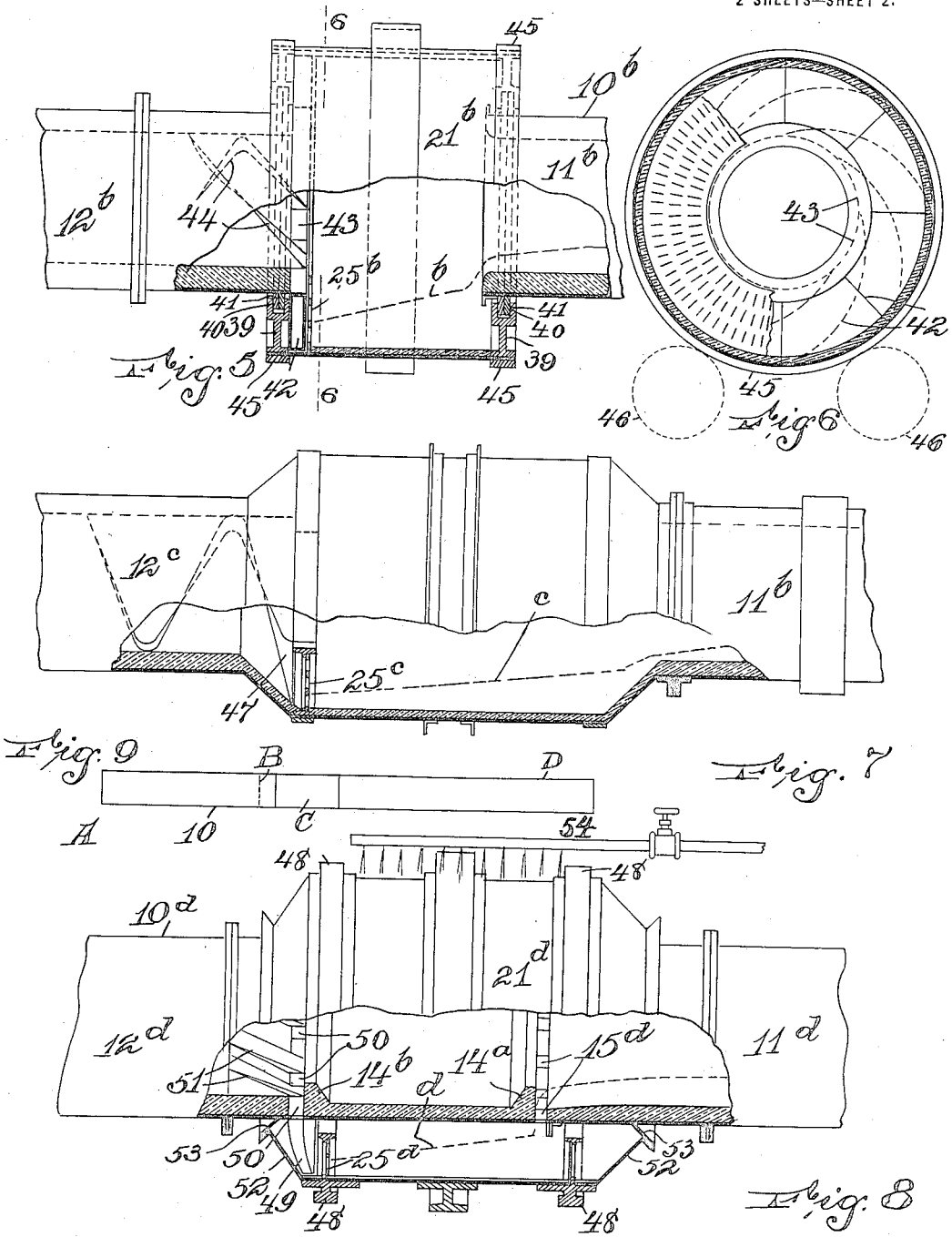

WILLIAM H. MASON, OF EASTON, PENNSYLVANIA.

APPARATUS FOR THE MANUFACTURE OF PORTLAND CEMENT AND SIMILAR PRODUCTS.

1,210,510.   Specification of Letters Patent.   Patented Jan. 2, 1917.

Application filed May 21, 1914. Serial No. 840,032.

*To all whom it may concern:*

Be it known that I, WILLIAM H. MASON, a citizen of the United States, and a resident of Easton, county of Northampton, and State of Pennsylvania, have invented certain new and useful Improvements in Apparatus for the Manufacture of Portland Cement and Similar Products, of which the following is a specification.

According to the practice now usually followed in the manufacture of Portland cement, the cement forming materials are ground to extreme fineness before their introduction into the rotary kiln. For grinding dry, expensive drying operations for driving off any surplus moisture which will interfere with dry grinding must be resorted to, so that the grinding can be effectually carried on. With wet grinding much surplus water must be added, the greater part of which accompanies the materials into the kiln and is only driven off in the kiln upon considerable excess expenditure of energy in the form of heat.

In either case, whether ground dry or wet, the entire weight of material introduced into the kiln when ground preliminarily, including the surplus weight afterward lost by driving off the carbon dioxid in the kiln, must be subjected to the grinding operation.

According to the present invention the cement forming material is introduced into the kiln without preliminary grinding, the constituents being subjected, preliminarily to their introduction into the kiln, only to moderate and inexpensive size reduction, preferably so that the largest particles will pass through a one-half inch screen or thereabout, though the precise extent of such preliminary size reduction is not material. These particles of cement forming material in the raw state and containing more or less moisture, when subjected to the heat of the kiln, are ruptured and made friable by the effects of heat thereon, including the sudden expansion of the contained moisture into steam, and are substantially completely calcined by being passed through the calcining zone of the kiln and subjected to heated gases therein, where all or the greater part of the carbon dioxid is driven off, and such cement forming material, before reaching the clinkering zone of the rotary cement kiln, while hot, without substantial reduction or loss of heat, and being reduced in weight by the elimination of carbon dioxid, and more or less broken down and rendered friable by the various effects of the heat thereon, is subjected to a grinding operation and after being ground is delivered to the clinkering zone of the kiln in finely divided form ready for making perfect cement clinker. The last stages of calcining the material may be, and preferably are, carried out during the grinding operation. It will be seen that in this manner the expense and trouble of carrying on drying and dry grinding operations, or water grinding and driving off the surplus water in the kiln, are avoided. By driving off substantially all the carbon dioxid before grinding, the material to be ground is substantially reduced in weight over the material which would have to be subjected to preliminary grinding, and the breaking down effect of the heat upon the particles of cement forming material and attrition upon one another in the rotary kiln is completely utilized, thus greatly reducing the grinding left to be done and the power required for the work of grinding, and at the same time making it possible to get the materials into a very finely divided or pulverized condition.

Other advantages of my invention will appear in the course of my further description, and with the foregoing and related objects in view my invention consists in the parts, improvements and combinations herein set forth and claimed.

In the accompanying drawings I have shown, for the purpose of illustration only, several different forms of apparatus in which my invention may be embodied.

In said drawings, forming part of this specification and wherein the same reference numerals are uniformly applied to designate the same parts, Figure 1 is a fragmentary plan view, with parts broken away for clearness of illustration, and showing a ball or tube mill arranged at one side of a rotary cement kiln for receiving material therefrom, grinding it and redelivering it to the kiln without substantial loss of heat. Fig.

2 is a cross-sectional view taken on line 2—2 in Fig. 1. Fig. 3 is a cross-sectional view taken on line 3—3 in Fig. 1. Fig. 4 is a cross-sectional view taken on line 4—4 in Fig. 1. Fig. 5 is a fragmentary side view, with parts broken away, and illustrating a grinding mill interposed between two parts of a rotary cement kiln and in line therewith so that a continuous passage is formed through the kiln and the grinding mill, the grinding mill being arranged so that it may be rotated separately from the kiln. Fig. 6 is a cross-sectional view taken on line 6—6 in Fig. 5. Fig. 7 is a fragmentary side view with parts broken away and showing a grinding mill arranged between two parts of a cement kiln and in line therewith so that the central opening through the mill is a continuation of the kiln bore, but the mill of Fig. 7 is formed substantially as a part of the rotary kiln and rotates at the same speed. Fig. 8 is a view similar to Fig. 7, but showing a grinding mill surrounding a rotary cement kiln and arranged to receive material therefrom and to deliver it thereto after grinding, and Fig. 9 is a diagrammatic side view showing the preferred disposition of the grinding apparatus with respect to a rotary cement kiln.

Having reference to the apparatus illustrated in Figs. 1 to 4, and which illustrates how my improvements are preferably applied to an old kiln already installed, the reference numeral 10 is applied to indicate the kiln generally, and the same comprises the two parts 11 and 12, from the former of which portions, 11, the material is taken before grinding, and to the latter of which, 12, it is returned after grinding, the calcining being carried on in the part 11 and the clinkering in the part 12. 13 designates an inwardly extending flange formed, for example, of fire brick, and separating the two portions 11 and 12 of the kiln, but being provided with a central opening 14 for the passage of the heated gases of the kiln. Such flange 13, which may be of any form, serves as a stop for the material passing downward through the section 11 of the kiln toward the section 12, and means are provided adjacent to said flange or stop 13 for securing the discharge of the cement forming material from the kiln. In the form shown the kiln section 11 is provided with a plurality of openings 15 which open into a shell or jacket 16 surrounding the kiln in that neighborhood, and a plurality of paddles or wings 17 are provided on the exterior of the kiln section 11 and fitting fairly closely within the shell or casing 16. A discharge aperture 18 is provided for permitting the discharge of material from the shell or casing 16, and such material, after passing through the openings 15 at or in the neighborhood of the bottom of the kiln section 11, passes into the shell or casing 16 and is carried to the discharge opening 18 by means of the paddles or wings 17 as the kiln is rotated. The shell or casing 16 is provided with an extension 19 which is in communication with the feed opening 20 of the mill 21. Within the casing 19, and preferably secured to rotate with the mill 21, are provided means for lifting the material from the bottom of the casing 19 and delivering it to the interior of the mill 21. In the form shown, such lifting means consists of spirally arranged feed chutes 22 communicating at their mouths 23 with the interior of the casing 19 at its periphery, and at their discharge ends 24 with the intake opening 20 of the mill 21. The mill 21 may be an ordinary slug or ball mill and may contain, as is usual, a quantity of slugs or balls which may be of any material so long as they are heavy, resistant to wear, and capable of withstanding high heat. The mill 21 at the end opposite the intake opening 20 is provided with the usual screen 25 through which the pulverized cement forming materials will readily pass, but which will retain the balls, slugs or the like, used for grinding. At the end opposite the intake 20 means are provided for redelivering the ground cement forming material to the interior of the kiln. Such means may comprise radial wings or paddles 26 fitting closely within the shell or jacket 27 for lifting the ground material from the bottom of the jacket 27 to which it is delivered from the mill, the worm 28 arranged within the casing 29 which is a continuation of the shell or casing 27, the casing 30 arranged to encircle the kiln 10 and the curved scoops or pockets 31 which are attached to the kiln 10 and communicate with the openings 32, through which openings the material is redelivered to the kiln below the flange 13. All the parts of the casings are tightly and securely and closely connected together and closely encircle the kiln in such manner as to prevent substantial inlet of air, escape of dust and loss of heat by the material traveling therethrough.

Any means of imparting rotation to the kiln, the mill and the worm 28, may be used. In the illustration, the kiln and mill are shown chain driven from suitable sources of power as 33 and 34, and the worm shaft has a pulley wheel 35 thereon for attaching a belt or other suitable driving means thereto. With the arrangement shown, comprising the worm 28, the cement forming material after grinding may be redelivered to the section 12 of the kiln 10 adjacent to the flange 13. Other conveying apparatus than the worm 28 may be used for this purpose, or the same may be entirely dispensed with, if desired. A steam pipe 36 may be extended into the mill 21 for supplying steam thereto, if desired, and a valve as 37 may be arranged for turning the steam on or off. The section 11 of the kiln may be provided with shelves as indicated in dotted lines at 38 for showering the material through the hot gases, and such arrangement is preferably used if the material fed to the kiln contains a considerable amount of moisture, as the presence of moisture here will permit such treatment without undue dust losses, the material not being finely ground when fed to the kiln.

In Fig. 5 I have shown the two sections of the kiln 11$^b$ and 12$^b$ separated somewhat from one another and a grinding mill 21$^b$ interposed therebetween, the central opening through such mill being a continuation of the bore of the kiln 10$^b$. The mill 21$^b$ is so arranged with respect to the sections 11$^b$ and 12$^b$ that it may be rotated separately and at such speed as may be required and so that there will be little or no opportunity for the escape or inlet of air or gases. In the form shown, the end walls 39 of the mill section are provided with annular grooves 40, 40, in which the flanges 41, 41 of the kiln sections 11$^b$ and 12$^b$ are received. Such arrangement prevents the passage of gases and air and at the same time permits contraction and expansion through a considerable range. The dotted line $b$ represents substantially the level assumed by the cement forming material in its progress through the section 11$^b$ of the kiln and through the mill. Since the ground material is delivered through the screen 25$^b$ at a lower level than the kiln section 12$^b$, it becomes necessary to provide means for elevating ground cement forming material into the kiln section 12$^b$, and for this purpose I may provide the kiln section 12$^b$ with a number of spiral chutes 42 for elevating the material which has passed the screen 25$^b$ so that it may fall through the openings 43 into the kiln section 12$^b$, and helical ribs or shelves 44 may be provided in the interior of the kiln section 12$^b$ for directing and delivering the falling material well into the section 12$^b$. The mill section being preferably larger in diameter than the kiln sections causes a reduction in draft in such neighborhood, thereby materially reducing dust losses due to the strong kiln draft. Any means of rotating the kiln sections 11$^b$ and 12$^b$ and the mill section 21$^b$ may be utilized and each thereof may be separately driven at the appropriate speed. In the form shown the mill section 21$^b$ is provided with tires 45 by which it is rotatably supported upon rollers 46.

The form of apparatus shown in Fig. 7 differs from that shown in Fig. 5 principally in that there is no relative rotary movement between the kiln sections and the mill section, the kiln sections and the mill section being formed as one continuous structure, all rotating at the same speed. With such arrangement the mill section is preferably enlarged in diameter over the kiln sections so as to have a somewhat increased peripheral speed for doing the grinding work and to cause a local reduction of draft in this neighborhood. The position assumed by material being acted upon is indicated by the dotted line $c$. For delivering the ground material longitudinally through the screen 25$^c$ to the interior of the kiln section 12$^c$, one or more spiral ribs or vanes 47 may be provided.

In Fig. 8 I have shown a still further modified form of apparatus in which the grinding mill is arranged to surround the kiln. The outer circular wall of the mill 21$^d$ is provided with tires 48 which may run on suitable rollers, and the interior of the kiln 10$^d$ is preferably provided with two spaced flanges 14$^a$ and 14$^b$. A series of openings 15$^d$ are provided in the kiln section 11$^d$ adjacent to the flange 14$^a$, and the cement forming material on its passage through the kiln coming in contact with the flange 14$^a$ drops through the openings 15$^d$ into the mill 21$^d$, the position assumed by its surface being indicated by the dotted line $d$, and after being ground, is passed out through the screen 25$^d$ and is picked up by the pockets 49 on the kiln which communicate with the holes 50 in the kiln section 12$^d$, and inclined longitudinal vanes 51 are preferably provided on the interior of the kiln section 12$^d$ for conducting the cement forming material away from the flange 14$^b$ alongside of which the openings 50 are arranged. Suitable means for securing tight connections between the parts are provided, and for this purpose I may provide the mill 21$^d$ with end sections 52 having preferably inwardly inclined closing rings 53 attached thereto and fitting closely about the kiln sections though other forms of closure may be made use of.

I may provide means for cooling the mill somewhat when desired, as by providing a water sprinkling pipe 54, as shown in Fig. 8, for spraying jets of water on the mill or mill section, but this arrangement is not designed to cause any substantial loss of the heat of the cement forming material, but merely to prevent excessive and destructive heating of the pulverizing apparatus.

In Fig. 9 I have shown, diagrammatically, a cement kiln 10. The fuel supply and clinker discharge end are indicated by reference letter A, the clinkering zone ends substantially at the dotted line B. The preferred location of the grinding mill with respect to the entire length of the kiln is indicated at C and the stack and material supply end at D. The precise relation of the parts may be varied somewhat from that shown, however, it being important that the mill is so located as that the calcining of the cement forming material and the driving off of the carbon dioxid shall have been nearly or completely accomplished before the material is delivered to the mill, and further that the location of the mill shall be at such distance from the fuel supply end A as that under no operating conditions shall the clinkering zone extend so far as to reach the grinding mill.

In operating in accordance with my invention the material for forming cement, which is usually a mixture of high calcium stone and low or non-calcium stone or clay, is fed to the calcining section of the kiln which, as is usual, is arranged at an incline so that upon rotation the material will be gradually fed toward the opposite end. Such material is not subjected to preliminary grinding but is preferably sufficiently reduced in size to pass through the meshes of a one-half inch screen or thereabouts. This fairly coarse material may be raised as by means of the shelves 38 and showered to the bottom of the kiln, thus being passed through and through the heated gases as the feeding progresses, though this feature may be dispensed with, if desired. As the material under the influence of the heat in the kiln becomes heated the moisture contained expands and is driven off and carried away, and the materials are more or less broken down by this action and by the various other effects of heat thereon, and by the time it reaches the grinding mill, all or nearly all of the carbon dioxid is driven off so that the weight of the material is thereby reduced to about two-thirds of the amount fed to the kiln, and the material is broken down and "honeycombed" by the heat effects, especially on the outside of separate particles, so that when subjected to grinding it is readily and rapidly reduced to extreme fineness. Any cores produced in this way which have not yet been calcined in the calcining zone, are thoroughly exposed to the heat and are calcined, and thus an atmosphere containing carbon dioxid may be created in the mill section which aids greatly in projecting any metal parts and preventing free oxidation thereof. The material being subjected to the grinding operation while hot, any tendency to clog the mill by the material becoming hydrated, as may happen if it is first calcined and then cooled before grinding, is avoided. After passing through the mill the finely divided materials, in a much finer state than is commercially obtainable by preliminary grinding, are delivered to the clinkering zone of the rotary kiln and are then converted into cement clinker in the usual manner, except that such action is more thorough by reason of the greater fineness and can be carried on at a somewhat reduced temperature from the usual practice by reason of the facility with which the action of clinkering takes place in the finely divided material.

According to present practice it is customary to pulverize together the mixture of high calcium stone and low or non-calcium stone or clay. Usually the high calcium content of the mixture is harder and more resistant to pulverization than the low calcium part; then as these are pulverized together, the low calcium content naturally goes finer than the hard or high calcium stone and the majority of the coarser parts of the pulverized material are higher in lime than the average of the mass. I have repeatedly had the residue left on a fine sieve of 200 mesh per inch of a ground mixture of high and low calcareous stone analyzed, and have found its calcium content to be higher than the average of the material before it is passed through the screen. After the material is subjected to the heat of the calcining zone, the opposite situation is presented, and the calcined particles of material high in lime content may be finely pulverized more readily than the particles of the materials carrying less lime. It is generally recognized that the coarse particles of the material high in calcium content is what causes cement to be "unsound." It is also generally recognized, on the other hand, that a too low proportion of lime will cause the cement to be quick setting and slow hardening. With my improved process, the range between cement which will be on the one hand unsound and on the other hand too quick setting and slow hardening, is very much increased, and the certainty with which sound cement, which will not set too quick and harden too slowly, can be produced is of very great advantage.

It is to be understood that my invention is not confined to the specific apparatus shown for purposes of illustration, but that modifications and departures may be made therefrom, within the scope of my claims, without departing from my invention or sacrificing any of the advantages thereof.

Having thus described my invention, what I claim is:

1. In cement apparatus, a rotary kiln section for calcining unground cement forming material, a clinkering kiln section substantially in line therewith, and a rotary grinding mill intermediate the two kiln sections, there being an uninterrupted substantially straight closed passage through the kiln sections and the mill whereby the cement forming material is first calcined, then ground and then clinkered, and the products of combustion and gases pass continuously and directly through the apparatus in the opposite direction.

2. In cement apparatus, a rotary kiln section for calcining unground cement forming material, a rotary clinkering kiln section in line therewith, and a rotary grinding mill intermediate the two kiln sections and of a larger diameter, there being a continuous closed passage through the kiln sections and mill, and the kiln sections and mill being each separately rotatable, substantially as set forth.

In testimony that I claim the foregoing, I have hereunto set my hand this 19th day of May, 1914.

WILLIAM H. MASON.

Witnesses:
M. A. JOHNSON,
H. TRAUTVETTER.